United States Patent
Shen et al.

(10) Patent No.: US 9,552,102 B2
(45) Date of Patent: *Jan. 24, 2017

(54) BACKGROUND NOISE MEASUREMENT AND FREQUENCY SELECTION IN TOUCH PANEL SENSOR SYSTEMS

(71) Applicant: Qualcomm Technologies, Inc., San Diego, CA (US)

(72) Inventors: Guozhong Shen, San Jose, CA (US); Ozan E. Erdogan, Saratoga, CA (US); Syed T. Mahmud, Dublin, CA (US); Kenneth W. Knox, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,512

(22) Filed: Oct. 13, 2014

(65) Prior Publication Data

US 2015/0324061 A1    Nov. 12, 2015

Related U.S. Application Data

(63) Continuation of application No. 13/401,995, filed on Feb. 22, 2012, now Pat. No. 8,860,432.
(Continued)

(51) Int. Cl.
*G01R 29/26* (2006.01)
*G06F 3/041* (2006.01)
*G06F 3/044* (2006.01)

(52) U.S. Cl.
CPC .............. *G06F 3/0418* (2013.01); *G06F 3/044* (2013.01)

(58) Field of Classification Search
CPC ........................................................ G06F 3/041
See application file for complete search history.

(56) References Cited

U.S. PATENT DOCUMENTS 4,350,039 A   9/1982   van Dyke et al.
4,567,465 A   1/1986   Komiya
(Continued)

FOREIGN PATENT DOCUMENTS

CN      1255974 A      6/2000
CN   101080689 A     11/2007
(Continued)

OTHER PUBLICATIONS

"Fully Differential Op Amps Made Easy," Applicaiton Report SLOA099, Texas Instruments, May 2002.
(Continued)

*Primary Examiner* — Tung X Nguyen
*Assistant Examiner* — Feba Pothen
(74) *Attorney, Agent, or Firm* — Weaver Austin Villeneuve & Sampson LLP

(57) ABSTRACT

A touch panel sensor system that can dynamically measure noise and automatically switch to a frequency with minimal noise is described. The touch panel sensor system includes a sensor configured to detect a change in capacitance associated with a touch upon a touch panel. The system also includes a drive module configured to generate a drive signal having a first waveform characteristic (e.g., signal having a periodic waveform characteristic) during a first phase (e.g., sensor phase) and a second drive signal having a second waveform characteristic (e.g., constant voltage signal) during a second phase (e.g., noise detection phase). The first and second drive signals are configured to drive the sensor. The system also includes a measuring module coupled to the sensor that is configured to measure noise having the first waveform characteristic (e.g., periodic waveform characteristic) during the second phase.

19 Claims, 4 Drawing Sheets

Related U.S. Application Data

(60) Provisional application No. 61/495,240, filed on Jun. 9, 2011, provisional application No. 61/446,944, filed on Feb. 25, 2011.

(56) References Cited

U.S. PATENT DOCUMENTS

| | | | |
|---|---|---|---|
| 4,584,568 | A | 4/1986 | Zomorrodi |
| 4,764,717 | A | 8/1988 | Tucker et al. |
| 4,816,745 | A | 3/1989 | Schneider |
| 4,908,623 | A | 3/1990 | Ullestad |
| 4,939,520 | A | 7/1990 | Biglow |
| 4,949,398 | A | 8/1990 | Maas |
| 4,999,632 | A | 3/1991 | Parks |
| 5,321,403 | A | 6/1994 | Eng, Jr. et al. |
| 5,329,316 | A | 7/1994 | Kang |
| 5,781,044 | A | 7/1998 | Riley et al. |
| 5,799,248 | A | 8/1998 | Vice |
| 5,982,221 | A | 11/1999 | Tuthill |
| 6,031,217 | A | 2/2000 | Aswell et al. |
| 6,043,943 | A | 3/2000 | Rezzi et al. |
| 6,285,310 | B1 | 9/2001 | Michaelis et al. |
| 6,433,713 | B1 | 8/2002 | Fuhrman |
| 6,493,404 | B1 | 12/2002 | Iizuka et al. |
| 7,206,062 | B2 | 4/2007 | Asbrock et al. |
| 7,221,534 | B2* | 5/2007 | Anderson et al. ......... 360/77.12 |
| 7,482,870 | B2 | 1/2009 | Maejima et al. |
| 7,643,011 | B2* | 1/2010 | O'Connor et al. ........... 345/173 |
| 7,692,638 | B2 | 4/2010 | Land et al. |
| 7,808,255 | B2 | 10/2010 | Hristov et al. |
| 7,821,274 | B2 | 10/2010 | Philipp et al. |
| 7,821,502 | B2 | 10/2010 | Hristov |
| 7,864,160 | B2 | 1/2011 | Geaghan et al. |
| 7,877,076 | B2* | 1/2011 | Walkington ................. 455/323 |
| 7,898,329 | B1 | 3/2011 | Clara et al. |
| 7,907,020 | B2 | 3/2011 | Wilson |
| 7,920,134 | B2 | 4/2011 | Krah |
| 7,932,898 | B2 | 4/2011 | Philipp et al. |
| 7,986,313 | B2 | 7/2011 | Krah |
| 8,026,904 | B2 | 9/2011 | Westerman |
| 8,031,094 | B2 | 10/2011 | Hotelling et al. |
| 8,035,622 | B2 | 10/2011 | Hotelling et al. |
| 8,054,296 | B2 | 11/2011 | Land et al. |
| 8,077,160 | B2 | 12/2011 | Land et al. |
| 8,085,247 | B2 | 12/2011 | Wilson |
| 8,094,128 | B2 | 1/2012 | Vu et al. |
| 8,098,219 | B2* | 1/2012 | Kim .............................. 345/87 |
| 8,111,097 | B1 | 2/2012 | Kutz et al. |
| 8,125,456 | B2 | 2/2012 | Krah et al. |
| 8,232,970 | B2 | 7/2012 | Krah et al. |
| 8,310,472 | B2 | 11/2012 | Vu et al. |
| 8,354,991 | B2 | 1/2013 | Brown et al. |
| 8,390,588 | B2 | 3/2013 | Vu et al. |
| 8,441,462 | B2* | 5/2013 | Kobayashi et al. .......... 345/174 |
| 8,471,837 | B2 | 6/2013 | Vu et al. |
| 8,493,330 | B2 | 7/2013 | Krah |
| 8,575,988 | B2 | 11/2013 | Erdogan et al. |
| 8,643,619 | B2 | 2/2014 | Erdogan et al. |
| 8,659,343 | B2 | 2/2014 | Erdogan et al. |
| 8,860,432 | B2 | 10/2014 | Shen et al. |
| 8,878,797 | B2 | 11/2014 | Erdogan et al. |
| 9,086,439 | B2 | 7/2015 | Erdogan et al. |
| 2002/0011991 | A1 | 1/2002 | Iwasaki et al. |
| 2002/0072770 | A1 | 6/2002 | Pless |
| 2002/0077670 | A1 | 6/2002 | Archer et al. |
| 2003/0184356 | A1 | 10/2003 | Wang et al. |
| 2005/0052299 | A1 | 3/2005 | Oliaei |
| 2005/0104756 | A1 | 5/2005 | Tazartes et al. |
| 2005/0164669 | A1 | 7/2005 | Molnar et al. |
| 2005/0266817 | A1 | 12/2005 | Welland et al. |
| 2005/0275026 | A1 | 12/2005 | Tsividis et al. |
| 2006/0141976 | A1 | 6/2006 | Rohde et al. |
| 2006/0194560 | A1 | 8/2006 | Shu |
| 2007/0091053 | A1 | 4/2007 | Kajiwara et al. |
| 2007/0257890 | A1 | 11/2007 | Hotelling et al. |
| 2007/0268272 | A1 | 11/2007 | Perski et al. |
| 2008/0048997 | A1 | 2/2008 | Gillespie et al. |
| 2008/0158172 | A1 | 7/2008 | Hotelling et al. |
| 2008/0158178 | A1 | 7/2008 | Hotelling et al. |
| 2008/0252367 | A1 | 10/2008 | Pettersen et al. |
| 2008/0297487 | A1 | 12/2008 | Hotelling et al. |
| 2008/0309625 | A1 | 12/2008 | Krah et al. |
| 2009/0251196 | A1 | 10/2009 | Tsividis et al. |
| 2009/0315850 | A1 | 12/2009 | Hotelling et al. |
| 2009/0315851 | A1 | 12/2009 | Hotelling et al. |
| 2009/0318095 | A1 | 12/2009 | Shu |
| 2009/0322351 | A1 | 12/2009 | Mcleod |
| 2010/0033240 | A1* | 2/2010 | Denison et al. ................. 330/9 |
| 2010/0044122 | A1 | 2/2010 | Sleeman et al. |
| 2010/0066473 | A1 | 3/2010 | Fahs |
| 2010/0110037 | A1 | 5/2010 | Huang et al. |
| 2010/0110040 | A1 | 5/2010 | Kim et al. |
| 2010/0156811 | A1 | 6/2010 | Long et al. |
| 2010/0156846 | A1 | 6/2010 | Long et al. |
| 2010/0258360 | A1 | 10/2010 | Yilmaz |
| 2011/0001492 | A1 | 1/2011 | Nys et al. |
| 2011/0012618 | A1 | 1/2011 | Teterwak et al. |
| 2011/0018626 | A1 | 1/2011 | Kojima |
| 2011/0025634 | A1 | 2/2011 | Krah et al. |
| 2011/0061949 | A1 | 3/2011 | Krah et al. |
| 2011/0095991 | A1 | 4/2011 | Philipp et al. |
| 2011/0147723 | A1 | 6/2011 | Hodges, Jr. et al. |
| 2011/0193817 | A1 | 8/2011 | Byun et al. |
| 2011/0205181 | A1* | 8/2011 | Nagata et al. ................ 345/174 |
| 2011/0248723 | A1 | 10/2011 | Yeh et al. |
| 2011/0261005 | A1 | 10/2011 | Joharapurkar et al. |
| 2011/0273189 | A1 | 11/2011 | Gerber |
| 2011/0273399 | A1 | 11/2011 | Lee |
| 2012/0056841 | A1 | 3/2012 | Krenik et al. |
| 2012/0218222 | A1 | 8/2012 | Shen et al. |
| 2012/0287077 | A1 | 11/2012 | Pant et al. |
| 2013/0069905 | A1 | 3/2013 | Krah et al. |
| 2013/0088245 | A1 | 4/2013 | Sezginer |
| 2013/0207906 | A1 | 8/2013 | Yousefpor et al. |
| 2014/0152328 | A1 | 6/2014 | Erdogan et al. |
| 2015/0048851 | A1 | 2/2015 | Erdogan et al. |

FOREIGN PATENT DOCUMENTS

| | | |
|---|---|---|
| CN | 101339479 A | 1/2009 |
| CN | 101371564 A | 2/2009 |
| CN | 101438179 A | 5/2009 |
| CN | 101467119 A | 6/2009 |
| CN | 101479692 A | 7/2009 |
| CN | 101490567 A | 7/2009 |
| CN | 101568805 A | 10/2009 |
| CN | 101755219 A | 6/2010 |
| CN | 101833044 A | 9/2010 |
| CN | 101937297 A | 1/2011 |
| CN | 101957218 A | 1/2011 |
| JP | 3987294 B2 | 10/2007 |
| TW | 201017184 A | 5/2010 |
| WO | WO-9938019 A1 | 7/1999 |
| WO | WO-2004051550 A1 | 6/2004 |
| WO | WO-2012148539 A1 | 11/2012 |

OTHER PUBLICATIONS

Kim H-R., et al., "A mobile-display-driver IC embedding a capacitive-touch-screen controller system," Solide-State Circuits Conference Cegiest of Technical Papers (ISSCC), 2010 IEEE International, vol., No., pp. 114, 115, Feb. 7-11, 2010 doi: 10.1109/ISSCC.2010. 5434080.

Chinese First Office Action and Search Report dated May 18, 2015 issued in CN201210103158.2 [QUALP362ECN/154451U5CN].

\* cited by examiner

BACKGROUND NOISE MEASUREMENT AND FREQUENCY SELECTION IN TOUCH PANEL SENSOR SYSTEMS

CROSS-REFERENCE TO RELATED APPLICATIONS

The present application is a continuation U.S. patent application Ser. No. 13/401,995, filed on Feb. 22, 2012 and claims the benefit under 35 U.S.C. §119(e) of U.S. Provisional Application Ser. No. 61/446,944, entitled METHOD AND APPARATUS FOR CANCELLING TOUCH PANEL OFFSET OF A TOUCHSCREEN SENSOR, filed on Feb. 25, 2011; and U.S. Provisional Application Ser. No. 61/495,240, entitled METHOD AND APPARATUS FOR BACKGROUND NOISE MEASUREMENT AND FREQUENCY SELECTION IN TOUCHSCREEN SYSTEMS, filed on Jun. 9, 2011. U.S. Provisional Application Ser. Nos. 61/446,944 and 61/495,240 are herein incorporated by reference in their entireties.

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

SUMMARY

Techniques are described for measuring (e.g., detecting and/or measuring) background noise in a touch panel sensor system. In one or more implementations, the touch panel sensor system includes a sensor configured to detect a change in capacitance associated with a touch upon a touch panel. The system also includes a drive module configured to generate a drive signal having a first waveform characteristic during a first phase and a second drive signal having a second waveform characteristic during a second phase. The first and second drive signals are configured to drive the sensor. The system further includes a measuring module coupled to the sensor that is configured to measure noise having the first waveform characteristic during the second phase.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Noise, or unwanted signals, in capacitive touch sensing systems generally interfere with the operation of the systems. While capacitive touch sensing systems are designed to only measure signals related to a user's touch, noise signals generated from cold cathode fluorescent lamps (CCFL), AC/DC chargers, liquid crystal displays, and so forth, distort the touch signals so the touch signals cannot be properly measured by the sensors.

Accordingly, a touch panel sensor system configured to measure (e.g., detect and/or measure) background noise is described. The touch panel sensor system includes a sensor configured to detect a change in capacitance associated with a touch upon a touch panel. The system also includes a drive module configured to generate a drive signal having a first waveform characteristic (e.g., a periodic waveform) during a first phase (e.g., sensor detection phase) and a second drive signal having a second waveform characteristic (e.g., constant voltage signal) during a second phase (e.g., noise measurement detection phase). The first and second drive signals drive the sensor. The system also includes a measuring module coupled to the sensor that is configured to measure noise having the first waveform characteristic (e.g., a periodic waveform) during the second phase. The measuring module measures noise (e.g., analog noise) associated with the sensor (e.g., generated by the sensor, noise at the sensor, etc.) at a selected frequency when the sensor driver produces a second signal having a second waveform characteristic (e.g., a constant voltage signal). When the measured noise exceeds a threshold at the selected frequency, the touch panel sensor system may be configured to switch to one or more different frequencies in order to determine the frequency with the least measured analog noise. Thus, the touch panel sensor system may both detect the level of background noise at an operating frequency and then adjust the operating frequency to mitigate (e.g., minimize) interference of the background noise detected.

Example Implementations

Figure 1A:
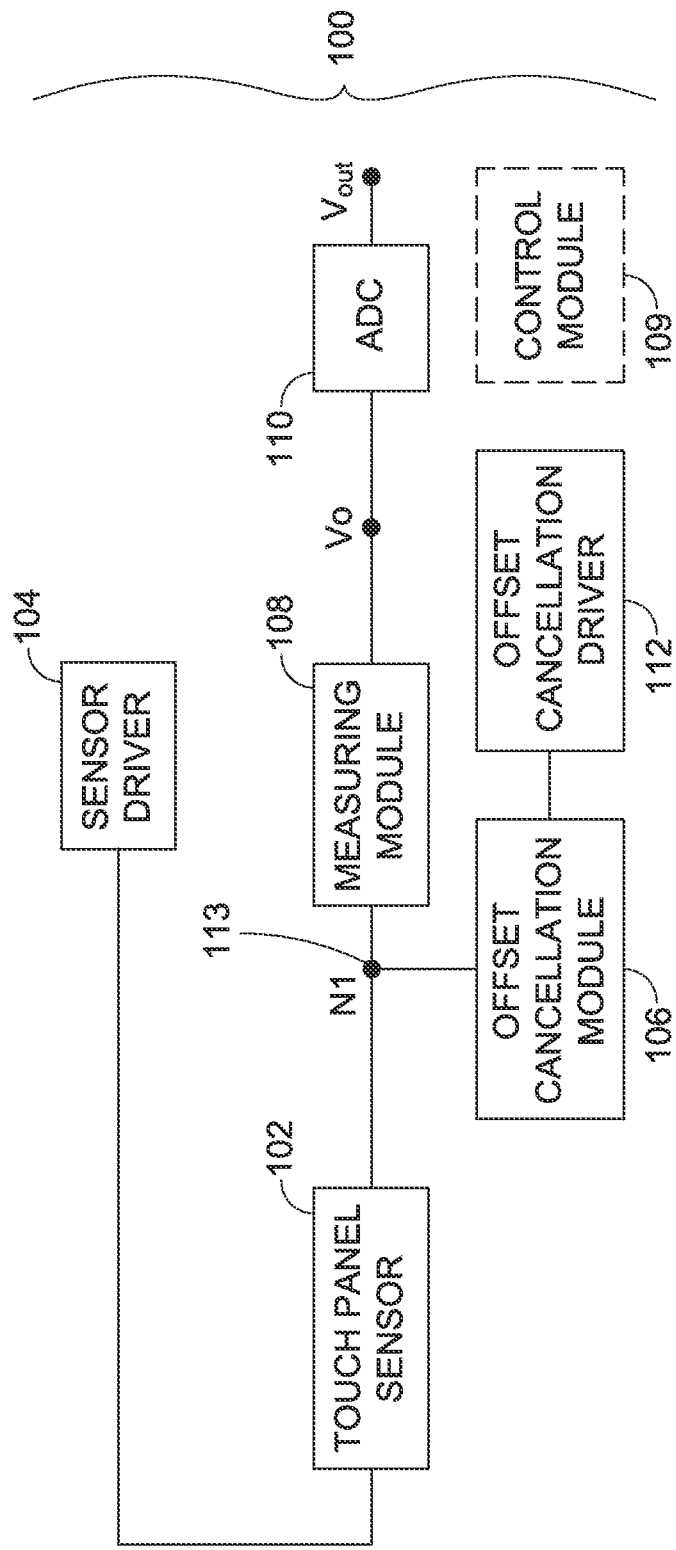
FIG. 1A is a block diagram illustrating a touch panel sensor system in accordance with an example implementation of the present disclosure.

FIG. 1A illustrates a block diagram of a touch panel sensor system 100 in accordance with an example implementation of the present disclosure. The touch panel sensor system 100 includes a touch panel sensor 102, a drive module (e.g., sensor driver 104), an offset cancellation module 106, a measuring module 108, an analog-to-digital converter (ADC) 110, and an offset cancellation drive module (e.g., offset cancellation driver 112). Viewed together, the touch panel sensor 102, the sensor driver 104, the offset cancellation module 106, the offset cancellation driver, the measuring module 108, and the ADC 110 comprise a capacitance-to-voltage converter circuit. In implementations, the touch panel sensor system 100 may include a greater number or a lesser number of the above components in accordance with the requirements of the system 100 (e.g., space restraints, functionality requirements, etc.). The touch panel sensor system 100 may also include additional components, such as multiplexers, controllers, and so forth. For example, one or more multiplexers may be coupled to multiple sensors of the touch panel sensor 102 and selectively output sensed capacitance signals from the selected sensors to the measuring module 108. In another implementation, the offset cancellation module 106 and the offset cancellation driver 112 may be omitted from the system 100. Moreover, in some implementations, the sensor driver 104, the measuring module 108, the ADC 110, the offset cancellation driver 112, and the offset cancellation module 106 may be fabricated onto a single integrated circuit chip (IC) device (e.g., each component is fabricated on a single die). In other implementations, one or more of the components described above may be external to the IC (e.g., fabricated on another IC device).

The sensor driver 104 (e.g., a drive module) is coupled (e.g., electrically connected) to the touch panel sensor 102. The sensor driver 104 is configured to generate a drive signal having periodic waveform characteristics (e.g., a periodic drive signal) during a sensor phase and generate a constant voltage signal (e.g., a DC voltage signal) during a noise detection phase. Each type of signal generated by the sensor driver 104 is configured to drive the coupled sensors (e.g., the touch panel sensor 102). In an implementation, the sensor driver 104 comprises a digital to analog converter (DAC). In another implementation, the sensor driver 104 may be other suitable devices capable of generating both constant voltage and analog driving signals. The touch panel sensor 102 is coupled to the output of the sensor driver 104 and the input of the measuring module 108. As a result, when the sensor driver 104 outputs a periodic drive signal during the sensor phase, the charge from the change in capacitance due to the touching of a touch panel surface (which incorporates the touch panel sensor 102) is transferred from the touch panel sensor 102 to the input of the measuring module 108 at node (N1). When the sensor driver 104 outputs a constant voltage signal, which is not detected by the analog portion of the system 100, the analog signal/charge generated by the background noise interfering with the coupled sensors (e.g., the touch panel sensor 102) is transferred to the input of the measuring module 108 at node (N1). Thus, the same circuitry that is utilized for detecting touch events (e.g., touches) may also be configured to detect the background noise associated with the touch panel sensor 102. In some embodiments, the touch panel sensor 102 is a capacitive touch panel having one or more capacitive sensors therein.

The offset cancellation driver 112 (e.g., an offset cancellation drive module) is coupled to the offset cancellation module 106. The offset cancellation driver 112 is configured to generate an offset cancellation drive signal having periodic waveform characteristics (e.g., a periodic offset cancellation signal) during a sensor phase and configured to generate a constant voltage offset cancellation drive signal during a noise detection phase. The offset cancellation signals are configured to drive the coupled offset cancellation module 106. In one or more implementations, the offset cancellation driver 112 is a DAC. In other implementations, the offset cancellation driver 112 may be other suitable devices capable of generating both constant voltage and analog driving signals. In some embodiments, one or more components of the sensor driver 104 may be shared by the offset cancellation driver 112. The offset cancellation module 106 is coupled to the output of the offset cancellation driver 112 and the input of the measuring module 108. The offset cancellation driver 112 is configured to generate a periodic offset cancellation signal during the sensor phase. Thus, the charge from the offset cancellation module 106 is transferred to the input of the measuring module 108 at node (N1). However, when the offset cancellation driver 112 generates a constant voltage signal (e.g., during a noise detection phase), which is not detected by the analog front end portion of the system 100 (e.g., measuring module 108, etc.), the analog signal/charge generated by the background noise interfering with the coupled offset cancellation module 106 is transferred to the input of the measuring module 108 at node (N1). As a result, the same circuitry utilized for detecting touch events can detect the background noise of the offset cancellation module 106. Thus, during the sensor phase, the charge output from the touch panel sensor 102 (e.g., due to a touch event upon the surface of a touch panel) and the charge output from the offset cancellation module 106 is at least partially combined at node (N1) before being measured by the measuring module 108. Additionally, during the noise detection phase, the charge caused by background noise of the touch panel sensor 102 and the charge caused by background noise of the offset cancellation module 106 is also combined at node (N1) before being measured by the measuring module 108. In an implementation, the offset cancellation module 106 may be a digitally controlled adjustable/variable capacitor, a capacitive DAC, and so forth. In another implementation, the offset cancellation module 106 may be other suitable devices capable of outputting various capacitances, voltages, combinations thereof, and so forth.

The output of the measuring module 108 is coupled to the input of the ADC 110. Thus, the capacitance charge measured at the input node (N1) can be transmitted as an analog voltage to the ADC 110 (e.g., measuring module 108 furnishes an analog voltage value ($V_o$) to the ADC 110). In one or more implementations, the measuring module 108 includes a frequency/phase selection module 124 (see FIG. 1B) so that the output analog voltage ($V_o$) of the measuring module 108 at least substantially corresponds to signals received by the measuring module 108 within the desired frequency of the frequency/phase selection module 124. A signal frequency of a signal of the measuring module 108 can be adjusted so that the desired frequency at least substantially matches, or includes, the frequency of the sensor signal to enable the sensor signals to be measured by the measuring module 108 while at least partially excluding unwanted signals (e.g. noise having frequency characteristics different from the frequency of the sensor signal). This matching also allows the measuring module 108 to at least substantially measure background noise (e.g., signals) within the desired frequency during the noise detection phase and exclude (e.g., not measure) occurring in other frequencies. In some implementations, the frequency/phase selection module 124 is configured to adjust the phase of the signal of (e.g., generated by) the measuring module 108 to at least approximately match the phase of the sensor signal at the input of the measuring module 108 so that the measuring module 108 measures background noise and/or sensor signals occurring within the at least approximately matched phases.

The voltage output of the ADC 110 ($V_{out}$) can be output from the system 100 to a device/circuit controlled by the touch panel sensor system 100. In an implementation, a control module 109 (e.g., control logic circuitry) is coupled to the touch panel sensor 102, the sensor driver 104, the offset cancellation driver 112, the ADC 110, the measuring module 108, and the offset cancellation module 106 to control the operation of the system 100. For example, as described herein, the control module 109 is configured to control various aspects of the offset cancellation driver 112, the offset cancellation module 106, and the like. In another implementation, the system 100 may be configured as an open loop system. In some embodiments, the system 100 may automatically temporarily transition to the noise detection phase (before returning to the sensor phase) after all the sensors (e.g., touch sensor 102) have been measured at least once during the sensor phase (e.g. one touchscreen panel image has been measured). In another embodiment, the system 100 may transition on demand, more frequency, or less frequently (as required by the system 100).

Figure 1B:
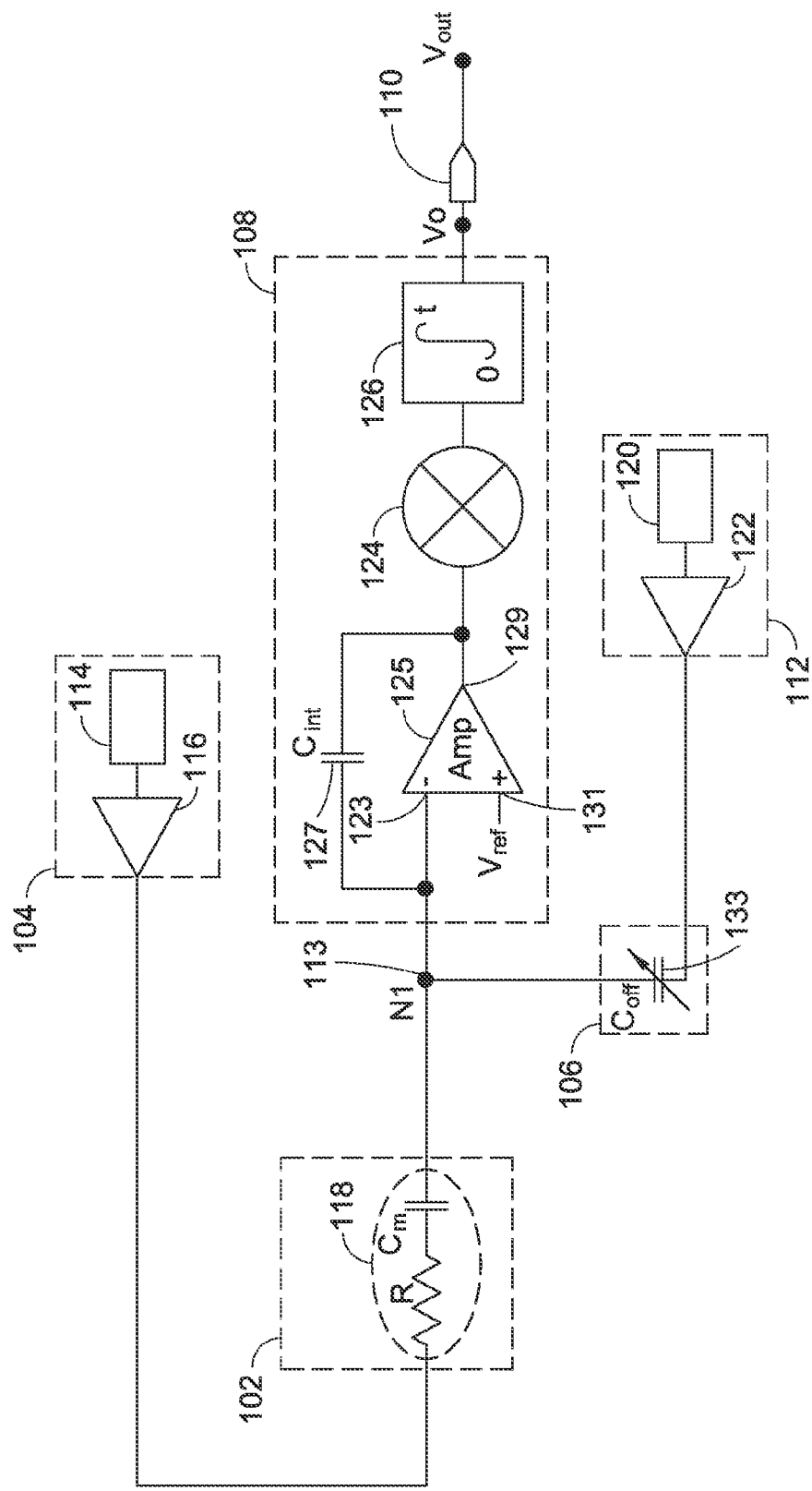
FIG. 1B is a circuit diagram illustrating the touch panel sensor system shown in FIG. 1A.

FIG. 1B illustrates a specific implementation of the touch panel sensor system 100 shown in FIG. 1A. As shown in FIG. 1B, the sensor driver 104 includes a sensor DAC 114 coupled to a buffer 116. The buffer 116 buffers the sensor waveform produced by the sensor DAC 114 and outputs the constant voltage signal or the periodic sensor signal to the sensor 118 of the touch panel sensor 102 to drive the sensor 118. In some embodiments, during the noise detection phase, the sensor DAC 114 generates a digital reference voltage ($V_{ref}$). During the sensor phase, the sensor DAC 114 generates an analog signal having waveform characteristics represented by the equation:

$$A1 \cdot \sin(\omega t), \quad \text{EQN. 1}$$

where A1 represents the amplitude of the signal, $\omega$ represents the angular frequency of the signal, and t represents time. However, in other implementations, the sensor DAC 114 may configured to output other signals having other waveform characteristics, such as signals having square waveform characteristics, and so forth.

The touch panel sensor 102 comprises a sensor 118 that can be modeled as a resistor (R) serially coupled to a mutual capacitor ($C_m$). While only a single resistor and capacitor is shown, it is understood that the sensor 118 may be modeled as including additional resistors, capacitors, other suitable capacitive sensing circuitry, combinations thereof, and so forth, according to the requirements of the system 100. The output of the sensor 118 is coupled to the output of the offset cancellation module 106 and the input of measuring module 108 at the node (N1). As shown, node (N1) 113 is also coupled to an inverting terminal 123 of an operational amplifier (Amp) 125 and the integrating capacitor ($C_{int}$) 127 of the measuring module 108. While only a single sensor 108 is shown, the touch panel sensor 102 may include a plurality of sensors 118 in accordance with the requirements of the system 100.

As described above, the measuring module 108 includes a frequency/phase selection module 124 (e.g., a frequency mixer). In some implementations, the measuring module may also include an integrator 126. As shown in FIG. 1B, a non-inverting terminal 131 of an amplifier (Amp) 125 is coupled to a voltage ($V_{ref}$) and the output 129 of the amplifier (Amp) 125 is coupled to the frequency/phase selection module 124. The frequency/phase selection module 124 is coupled to the integrator 126. The signal generated by the amplifier (Amp) 125 can be modified by the frequency/phase selection element 124 and the integrator 126. As a result, the modified signal is then transmitted from the measuring module 108 to the input of the ADC 110 so that the ADC 110 receives the output voltage ($V_o$) from the measuring module 108. In another implementation the measuring module 108 may comprise other circuitry capable of converting a received analog signal/charge to a corresponding output voltage having a desired gain. In yet another implementation, the measuring module 108 may comprise any device capable of receiving an analog signal having waveform characteristics approximately equal to the selected frequency and/or the selected phase (and corresponding to a capacitance) and outputting a voltage ($V_o$) that corresponds to the analog signal.

In one or more implementations, the frequency/phase selection module 124 is a frequency mixer configured to modify (e.g., multiply) an input analog signal having waveform characteristics approximately equal to the desired/selected frequency by a mixer signal (e.g. sin ($\omega t+\phi$) and filter (e.g., remove) input analog signals having waveform characteristics outside of the frequency $\omega$ and/or phase $\phi$ of the mixer signal. For example, the frequency/phase selection module 124 may receive a second input signal (e.g., a periodic signal represented by sin ($\omega t+\phi$), etc.) to modify the input analog signal. In an implementation, the measuring module 108 may be configured to allow signals having waveform characteristics (e.g., frequency, phase, etc.) that approximately match the selected frequency/phase to pass and to filter signals having waveform characteristics that do not match the selected frequency/phase. Thus, the measuring module 108 are configured to measure the periodic sensor signals having the selected frequencies/phases while excluding unwanted signals (e.g. noise) having different frequencies/phases. The matching of the frequency and/or the phase also allows the measuring module 108 to at least substantially measure background noise occurring within the selected frequency/phase during the noise detection phase (e.g., noise that can interfere with the periodic sensor signal). In another implementation, the frequency/phase selection module 124 may be other suitable devices capable of filtering input signals by frequency and/or phase. In some embodiments, the integrating capacitor ($C_{int}$) 127 may have a capacitance value of less than one hundred pico-Farads (<100 pF). For example, the integrating capacitor ($C_{int}$) 127 may have a capacitance value ranging from about fifteen to about twenty-five pico-Farads (15 pF to 25 pF). In some embodiments, the integrating capacitor ($C_{int}$) 127 has a capacitance value of about twenty pico-Farads (20 pF). However, it contemplated that the integrating capacitor ($C_{int}$) 127 may have greater capacitance values or lesser capacitance values as required by the system 100.

In one or more implementations, the offset cancellation driver 112 (e.g., offset cancellation module) is an offset cancellation DAC 120 coupled to a buffer 122. The buffer 122 is configured to buffer the offset cancellation signal generated by the offset cancellation DAC 120 and outputs the constant voltage or periodic offset cancellation signal to the offset cancellation module 106 (e.g., capacitor ($C_{off}$) 133) in order to drive the capacitor ($C_{off}$) 133. During the noise detection phase, the offset cancellation DAC 120 generates a digital reference voltage ($V_{ref}$). During the sensor phase the DAC 120 generates an analog signal having waveform characteristics represented by the equation:

$$A2 \cdot \sin(\omega t+\phi), \quad \text{EQN. 2}$$

where A2 represents the amplitude of the signal, $\omega$ represents the angular frequency of the signal, t represents time, and $\phi$ represents the phase of the signal. However, in other implementations, the sensor DAC 120 may configured to output other signals having other waveform characteristics, such as signals having square waveform characteristics, and so forth. In an implementation, the offset cancellation module 106 is an offset cancellation capacitor ($C_{off}$) 133, which is coupled to the output of the sensor 118 (e.g., touch panel sensor 102) and the input of measuring module 108 at the node (N1) 113, as well as being coupled to the inverting terminal 123 of the amplifier (Amp) 125 and the integrating capacitor ($C_{int}$) 127 of the measuring module 108.

In some embodiments, the offset cancellation capacitor ($C_{off}$) 133 is a digitally controlled variable capacitor (e.g., a capacitive digital-to-analog converter, and so forth). In some embodiments, the capacitance values of the offset cancellation capacitor ($C_{off}$) 133 may range from about twenty pico-Farads (20 pF) to less than one pico-Farad (<1 pF). In one or more implementations, the offset cancellation module 106 may be multiple capacitors and/or variable capacitors with associated circuitry so that the value of the capacitance charge/voltage output by the offset cancellation module 106 is adjustable. In other implementations, the offset cancellation module 106 may be other devices capable of having adjustable capacitance values. The offset cancellation capacitor ($C_{off}$) 133 and the integrating capacitor ($C_{int}$) 127 may have capacitances that are multiples of a chosen unit capacitor to form good matching between them. For example, if the chosen unit capacitor has a capacitance of two pico-Farads (2 pF), capacitor ($C_{off}$) 133 and ($C_{int}$) 127 may have values of sixty pico-Farads (60 pF) and twenty pico-Farads (20 pF), respectively. In another example, the offset capacitor ($C_{off}$) 133 and the integrating capacitor ($C_{int}$) 127 may comprise unrelated capacitive values.

The ADC 110 is coupled to the output of the measuring module 108 so that the voltage ($V_o$) output by the integrator 126 is converted from an analog voltage value to a digital voltage value ($V_{out}$).

Example Methods

Figure 2:
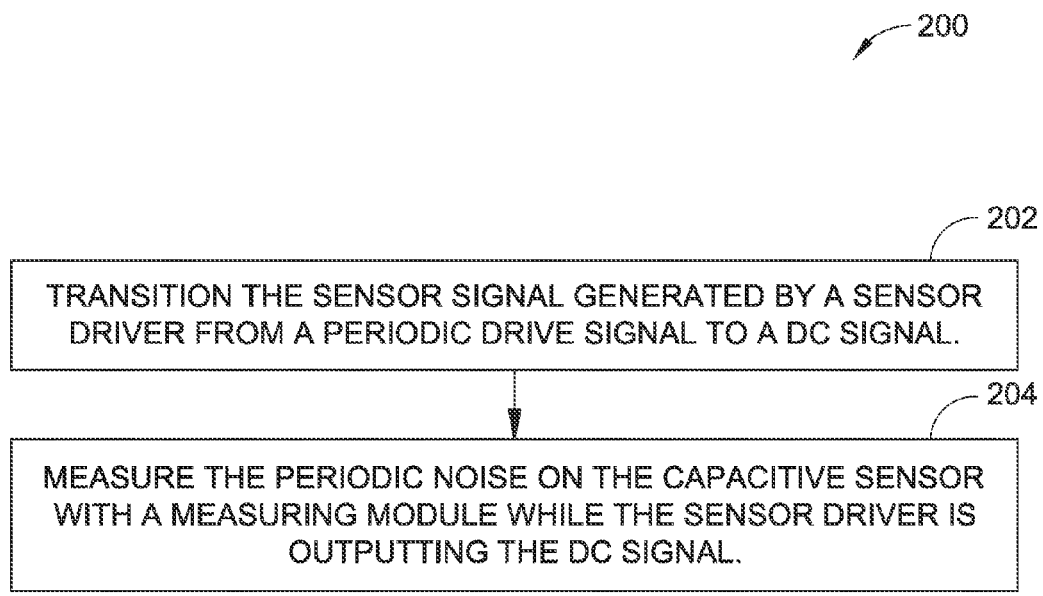
FIG. 2 is a flow diagram illustrating an example method of measuring background noise within the touch panel sensor system according to an example implementation of the present disclosure.

FIG. 2 is a flow diagram illustrating an example method 200 for measuring background noise within the touch panel sensor system 100 in accordance with the present disclosure. As shown, the sensor waveform signal generated by the sensor driver is transitioned from a periodic drive signal to a constant voltage signal (Block 202). For example, the sensor driver 104 may initially generate a drive signal having periodic waveform characteristics. The sensor driver 104 may receive a signal (e.g., from the control module 109, etc.) to transition the drive signal having periodic waveform characteristics to a constant voltage signal). The measuring module measures/detects the noise at (e.g., on) the capacitive sensor while the sensor driver outputs the constant voltage signal (Block 204). For example, the measuring module 108 is configured to measure/detect periodic noise at the capacitive sensor 118 while the sensor driver 104 outputs the constant voltage signal. As a result, the system 100 may determine the amount of background noise at/on the sensors 118 at the selected frequency and/or the selected phase (e.g., noise having frequency and/or phase characteristics approximately equal to the selected frequency and/or the selected phase) of the measuring module 108. In one or more implementations, the offset cancellation signal generated by the offset cancellation driver 112 may be transitioned from a periodic signal (e.g., signal having periodic waveform characteristics) to a constant voltage signal so that offset cancellation module 106 receives the constant voltage offset signal. Thus, the measuring module 108 is configured to measure/detect the periodic noise at/on the capacitive sensor 118 (and/or the offset cancellation module 106) while both the offset cancellation driver 112 is outputting the constant voltage offset signal and the sensor driver 104 is outputting the constant voltage signal. As a result, the system 100 (e.g., via the measuring module 108) is able to measure the background noise at/on both the sensors 118 and the offset cancellation module 106.

In another implementation, the frequency and/or phase of the frequency/phase selection module 124 of the measuring module 108 may be adjusted so that the frequency and/or phase is at least approximately equal to a preselected frequency range and/or phase range to allow the measuring module 108 to measure/detect at least a portion of the analog noise occurring within the preselected frequency range and/or phase range. In some embodiments, the preselected frequency (of the measuring module 108) is based on the frequency ω of the sensor periodic drive signal and/or the phase is based on the phase of the sensor periodic drive signal at the node (N1) 113. Thus, the system 100 (measuring module 108) may be configured to measure/detect the portion of the background noise having a frequency and/or phase that would interfere with the operation of the system 100. In one or more implementations, the system 100 transitions from the sensor phase to the noise detection phase periodically after each of the sensors 118 has been measured by the measuring module 108 at least once. For example, the system 100 may remain in the sensor phase until each sensor 118 of the touch panel is measured so that an image of the touches over the surface of the touch panel is determined, transition to noise detection phase to determine the noise within the system 100, and then transition back to the sensor phase. In another example, the system 100 may transition to the noise detection phase upon demand by a user and/or upon other pre-determined time schedules.

Figure 3:
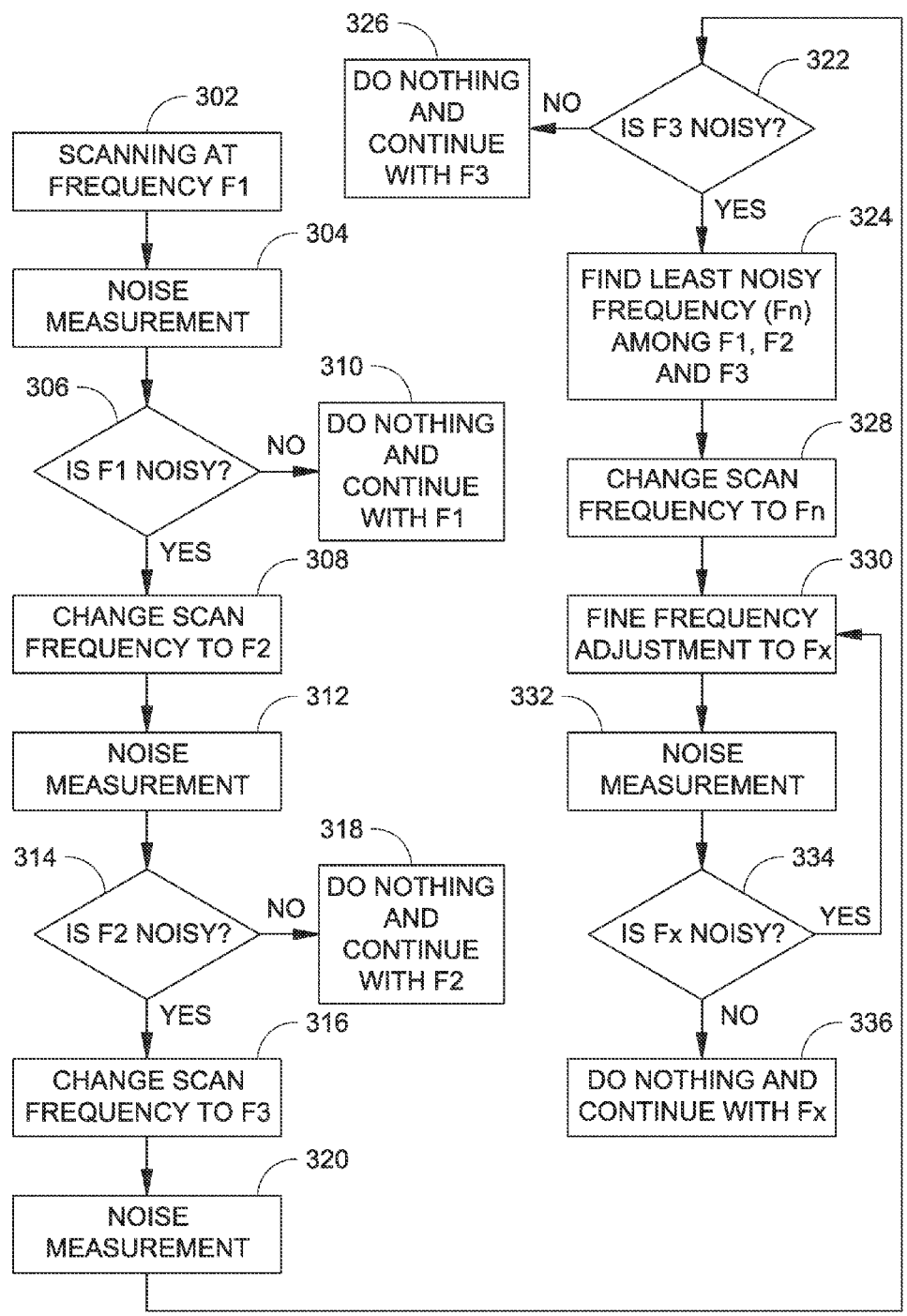
FIG. 3 is a flow diagram illustrating an example method of adjusting the frequency of a touch panel sensor system to reduce the measured background noise according to an example implementation of the present disclosure.

FIG. 3 is a flow diagram illustrating an example method 300 for adjusting a frequency to reduce the measured background noise of the touch panel sensor system 100 in accordance with the present disclosure. The frequency/phase selection module is set to select signals having frequencies approximately equal to a predetermined frequency F1 (Block 302). In an implementation, the control module 109 is configured to cause the frequency/phase selection module 124 to select (e.g., allow signals to pass) signals having frequencies approximately equal to the predetermined frequency F1. The measuring module measures/detects the amount of noise (see Block 202 and Block 204 of FIG. 2 for detecting the noise) at the predetermined frequency F1 (Block 304). In one or more implementations, the measuring module 108 measures/detects the amount of background noise at the predetermined frequency F1 on the system 100. A determination is made as to whether the analog noise measured at the selected frequency F1 exceeds a predetermined threshold (Decision Block 306). If the noise at the selected frequency F1 does not exceed the predetermined threshold (NO from Decision Block 306), the system 100 maintains the selected frequency F1 and transitions to sensor phase (Block 310). For example, the control module 109 may cause the sensor driver 104 and/or the offset cancellation driver 112 to generate drive signals having frequency characteristics approximately equal to the frequency F1. If the noise at the selected frequency F1 exceeds the predetermined threshold (YES from Decision Block 306), the system 100 (e.g., control module) selects another pre-determined frequency for measuring/detection purposes.

The frequency/phase selection module is set to select signals having frequencies approximately equal to a predetermined frequency F2 (Block 308). In an implementation, the control module 109 is configured to cause the frequency/phase selection module 124 to select (e.g., allow signals to pass) signals having frequencies approximately equal to the predetermined frequency F2. The measuring module measures/detects the amount of noise (see Block 202 and Block 204 of FIG. 2 for detecting the noise) at the predetermined frequency F2 (Block 312). In one or more implementations, the measuring module 108 measures/detects the amount of background noise at the predetermined frequency F2 on the system 100. A determination is made as to whether the analog noise measured at the selected frequency F2 exceeds a predetermined threshold (Decision Block 314). If the noise at the selected frequency F2 does not exceed the predetermined threshold (NO from Decision Block 314), the system 100 maintains the selected frequency F2 and transitions to sensor phase (Block 318). If the noise at the selected frequency F2 exceeds the predetermined threshold (YES from Decision Block 318), the system 100 (e.g., control module 109) selects another pre-determined frequency for measuring/detection purposes.

The f frequency/phase selection module is set to select signals having frequencies approximately equal to a predetermined frequency F3 (Block 316). In an implementation, the control module 109 is configured to cause the frequency/phase selection module 124 to select (e.g., allow signals to pass) signals having frequencies approximately equal to the predetermined frequency F3. The measuring module measures/detects the amount of noise (see Block 202 and Block 204 of FIG. 2 for detecting the noise) at the predetermined frequency F3 (Block 320). In one or more implementations, the measuring module 108 measures/detects the amount of background noise at the predetermined frequency F3 on the system 100. A determination is made as to whether the analog noise measured at the selected frequency F3 exceeds a predetermined threshold (Decision Block 322). If the noise at the selected frequency F3 does not exceed the predetermined threshold (NO from Decision Block 322), the system 100 maintains the selected frequency F3 and transitions to sensor phase (Block 318). If the noise at the selected frequency F3 exceeds the predetermined threshold (YES from Decision Block 322), the system 100 (e.g., control module 109) determines which of the frequencies F1, F2, or F3 had the least amount of determined noise (the determined least noisy frequency is denoted by Fn) (Block 324). Although only three frequencies (F1, F2, F3) are described, it is contemplated that more pre-determined frequencies or less pre-determined frequencies may be utilized.

As shown in FIG. 3, the frequency/phase selection module is set to select signals having frequencies approximately equal to the frequency that having the least amount of noise (frequency Fn). For example, the control module 109 is configured to cause the frequency/phase selection module 124 to select (e.g., allow signals to pass) signals having frequencies approximately equal to the frequency Fn. Once the frequency of the module is adjusted to frequency Fn, the frequency/phase selection module may be finely adjusted (e.g., the module may be adjusted in one kilohertz (1 kHz) increments) to select signals having frequencies within the fine adjustment frequency Fx (e.g., having a frequency value equal to the current frequency plus or minus a predefined delta frequency) (Block 330). For example, the module 124 may be adjusted to select signals within one kilohertz (1 kHz) increments of the frequency Fx (frequency Fx may have a value equal to the current frequency plus or minus a predefined delta frequency). In another implementation, the system 100 (control module 109) may begin the fine adjustment (e.g., selection of frequencies) of the frequency of the frequency/phase selection module 124 from other frequencies rather than the frequency Fn. For example, the predefined delta frequency may be approximately equal to a fraction of the difference between one or more of the preselected frequencies F1, F2 and/or F3. In yet another implementation, the module 124 may be adjusted to select signals having a frequency within about ten percent (+/− 10%) of the frequency Fx.

The measuring module measures the noise (see Block 202 and Block 204 of FIG. 2 for detecting the noise) occurring at the frequency (Block 332). A determination is made as to whether the analog noise measured at the selected frequency Fx exceeds a predetermined threshold (Decision Block 334). If the noise at the selected frequency Fx does not exceed the predetermined threshold (NO from Decision Block 334), the system 100 maintains the selected frequency Fx and transitions to sensor phase (Block 336). If the noise at the selected frequency Fx exceeds the predetermined threshold (YES from Decision Block 334), the system 100 (e.g., control module 109) may further finely adjust the frequency Fx to determine whether another frequency may be suitable for the sensor phase (e.g., moves to Block 330 to repeat Blocks 330 through 334). In an implementation, the frequencies F1, F2 and F3 are each preselected. In another implementation, F1 may be preselected and frequencies F2 and F3 are selected based on the frequency of F1. In yet another implementation, the touch panel sensor system 100 adjusts the frequency after each image is determined (e.g. after all of the sensors 118 have been measured during one period). In yet another implementation, the adjustment of the frequency may occur continuously, on demand, and/or according to other periodic schedules.

As described above, the method and apparatus for background noise measurement and frequency selection in a touch panel sensor system provides numerous advantages. Specifically, the touch panel sensor system 100, using the same circuit that is used to sense touches on the touchscreen, is able to determine the analog noise on the capacitive sensors at a selected frequency of the measuring module and then adjust that frequency in order to reduce background noise. As a result, the system 100 provides the benefit of only measuring noise that affects system performance and the ability to implement noise measurement into every frame panel scan so that there is no latency caused by the noise measurement Moreover, all this noise determination and minimization is able to be performed regardless of whether the touchscreen is currently being touched. Accordingly, the method and apparatus for background noise measurement and frequency selection in a touch panel sensor system has numerous benefits.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
 a sensor configured to detect a change in capacitance associated with a touch upon a touch panel;
 a measuring module coupled to the sensor;
 an offset cancellation drive module coupled to the measuring module, the offset cancellation drive module configured to generate, during a sensor detection phase, a first drive signal having a first periodic waveform characteristic and the drive module configured to generate, during a noise measurement detection phase, a second drive signal having a second, constant voltage, waveform; characteristic; wherein the first drive signal and the second drive signal drive the sensor and
 the measuring module is configured to measure, during the noise measurement phase, noise associated with the sensor having the first periodic waveform characteristic.

2. The system as recited in claim 1, wherein the measuring module comprises an operational amplifier having an integrating capacitor disposed between a non-inverting input and an output of the operational amplifier and a frequency/phase selection module coupled to the output of the operation amplifier, the frequency/phase selection module configured to modify a signal at the measuring module.

3. The system as recited in claim 2, wherein the measuring module further comprises an integrator coupled to the frequency/phase selection module.

4. The system as recited in claim 1, further comprising a control module coupled to the drive module, the control module configured to cause the drive module to generate the first drive signal during the sensor detection phase and to generate the second drive signal during the noise measurement detection phase.

5. The system as recited in claim 1, wherein the driver module comprises a digital-to-analog converter coupled to a buffer.

6. The system as recited in claim 1, wherein the sensor is a capacitive sensor that includes a resistor serially coupled to a mutual capacitor.

7. A system comprising:
a sensor configured to detect a change in capacitance associated with a touch upon a touch panel;
a measuring module coupled to the sensor;
a drive module coupled to the sensor, the drive module configured to generate, during a sensor detection phase, a first drive signal having a first periodic waveform characteristic and, during a noise measurement detection phase, a second drive signal having a second, constant voltage, waveform characteristic different from the first waveform characteristic, the first drive signal and the second drive signal for driving the sensor;
an offset cancellation module coupled to the measuring module, the offset cancellation module configured to furnish an adjustable capacitive value for the sensor;
an offset cancellation drive module coupled to the offset cancellation module, the offset cancellation drive module configured to generate, during the sensor detection phase, a first offset cancellation drive signal having the first periodic waveform characteristic and a second offset cancellation drive signal having the second, constant voltage, waveform characteristic during the noise measurement detection phase, the first offset cancellation drive signal and the second offset cancellation drive signal for driving the offset cancellation module; wherein
the measuring module is configured to detect noise having the first periodic waveform characteristic during the noise measurement detection phase, the noise associated with at least one of the sensor or the offset cancellation module.

8. The system as recited in claim 7, wherein the first drive signal and the first offset cancellation drive signal comprise a periodic signal, and wherein the second drive signal and the second offset cancellation drive signal comprise a constant voltage signal.

9. The system as recited in claim 7, wherein the measuring module comprises an operational amplifier having an integrating capacitor disposed between a non-inverting input and an output of the operational amplifier and a frequency/phase selection module coupled to the output of the operation amplifier, the frequency/phase selection module configured to modify a signal at the measuring module.

10. The system as recited in claim 9, wherein the measuring module further comprises an integrator coupled to the frequency/phase selection module.

11. The system as recited in claim 7, further comprising a control module coupled to the drive module and the offset drive module, the control module configured to cause the drive module to generate the first drive signal during the sensor detection phase and to generate the second drive signal during the noise measurement detection phase, the control module further configured to cause the offset cancellation drive module to generate the first offset cancellation drive signal during the sensor detection phase and to generate the second offset cancellation drive signal during the noise measurement detection phase.

12. The system as recited in claim 7, wherein at least one of the drive module or the offset cancellation drive module comprise a digital-to-analog converter coupled to a buffer.

13. The system as recited in claim 7, wherein the sensor is a capacitive sensor that includes a resistor serially coupled to a mutual capacitor.

14. A method comprising:
generating, during a sensor detection phase, a first drive signal having a first periodic waveform characteristic;
generating, during a noise measurement detection phase, a second drive signal having a second, constant voltage, waveform characteristic; wherein the first drive signal and the second drive signal drive the sensor;
initiating, during the noise measurement detection phase, a first noise measurement comprising the first periodic waveform characteristic at a measuring module, the first noise measurement associated with a sensor configured to detect a change in capacitance associated with a touch upon a touch panel;
determining whether the first noise measurement exceeds a predetermined threshold; and
initiating a second noise measurement comprising the second, constant voltage, waveform characteristic when the first noise measurement exceeds the predetermined threshold.

15. The method as recited in claim 14, further comprising determining whether the second noise measurement exceeds a predetermined threshold; and initiating a third noise measurement comprising a third waveform characteristic when the second noise measurement exceeds the predetermined threshold, the third waveform characteristic different from the second waveform characteristic, the third noise measurement associated with the sensor.

16. The method as recited in claim 15, further comprising determining whether the third noise measurement exceeds a predetermined threshold; and identifying a frequency associated with at least one of the first waveform characteristic, the second waveform characteristic, or the third waveform characteristic having the least noise measurement of the first noise measurement, the second noise measurement, and the third noise measurement.

17. The method as recited in claim 16, detecting a change in capacitance associated with the touch upon the touch panel, wherein the detection of the change in capacitance is associated with the identified frequency.

18. The method of claim 14, wherein the measuring module comprises an operational amplifier having an integrating capacitor disposed between a non-inverting input and an output of the operational amplifier and a frequency/phase selection module coupled to the output of the operation amplifier.

19. The method of claim 18, wherein the measuring module further comprises an integrator coupled to the frequency/phase selection module.

* * * * *